May 13, 1958

H. JENNY 2,834,680

METHOD FOR THE PRESERVATION OF ROASTED
AND GROUND COFFEE AND THE MAINTENANCE
OF THEIR NUTRITIVE VALUE

Filed April 12, 1954

INVENTOR
HANS JENNY
BY Maxwell E. Sparrow
ATTORNEY

May 13, 1958
H. JENNY
2,834,680
METHOD FOR THE PRESERVATION OF ROASTED
AND GROUND COFFEE AND THE MAINTENANCE
OF THEIR NUTRITIVE VALUE
Filed April 12, 1954
2 Sheets-Sheet 2
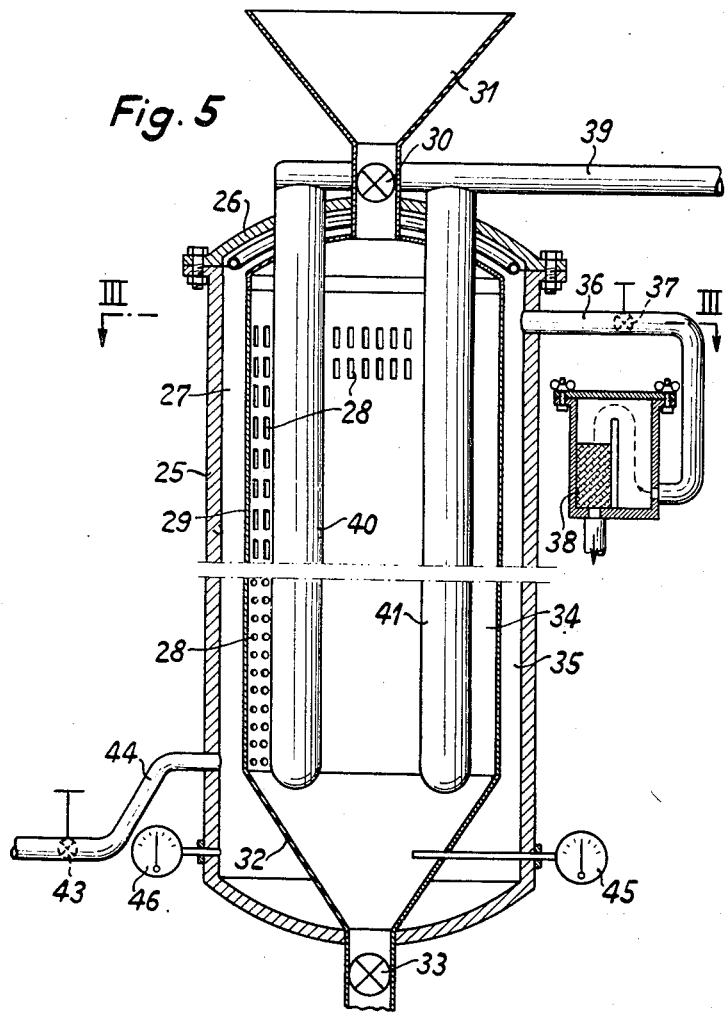
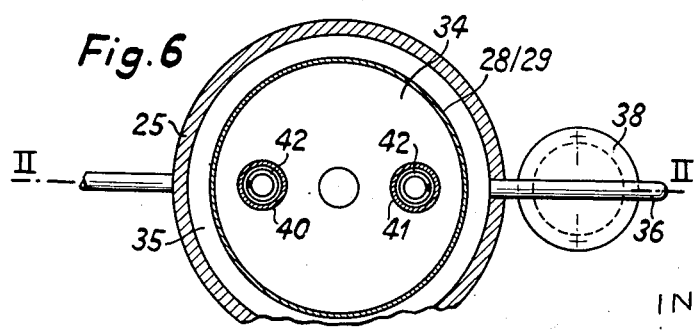
INVENTOR
HANS JENNY
BY Maxwell E. Sparrow
ATTORNEY 2,834,680

METHOD FOR THE PRESERVATION OF ROASTED AND GROUND COFFEE AND THE MAINTENANCE OF THEIR NUTRITIVE VALUE

Hans Jenny, Chur, Switzerland

Application April 12, 1954, Serial No. 422,587

Claims priority, application Switzerland April 10, 1953

5 Claims. (Cl. 99—68)

Attempts have already been made to preserve roasted and ground coffee, i. e. to keep the valuable aromatic substances, which are intimately bound to the fatty matter, in such a way that they do not disappear soon after the roasting process and reduce the value of the roasted product. All known preservation methods are based on knowledge of the fact, correct in itself, that the above mentioned fatty substance of the freshly roasted coffee is oxidized by the oxygen in the air and thus loses its property of aroma carrier. It has been intended to avoid this by enveloping the roasted coffee in so-called protective gases; attempts have also been made to aid the effect of these protective gases by previous vacuum treatment.

None of the known methods, however, yielded successful results because the internal morphology of the coffee bean and the processes operating in it during and after roasting were obviously unknown and thus were not taken into consideration. It may even be said that the suggested method of enclosing the roasted coffee in protective gases had the contrary effect to that intended; thus, the very presence of these protective gases made the coffee and its fatty aroma-carrying substance vulnerable to the detrimental influence of the roasting gases and of moisture. It is a fact that coffee treated in this manner acquired a musty taste and was subject to the formation of mildew.

It is intended to explain in the following the prerequisites for a successful preliminary treatment of coffee with a view to its preservation and the maintenance of its nutritive value, reference being made to the accompanying drawing in which:

Fig. 5 is a sectional elevation, on the line V—V of Fig. 6, of a boiler adapted to be used in the practice of the invention; and Fig. 6 is a cross-sectional view taken on the line VI—VI of Fig. 5.

Figure 1:
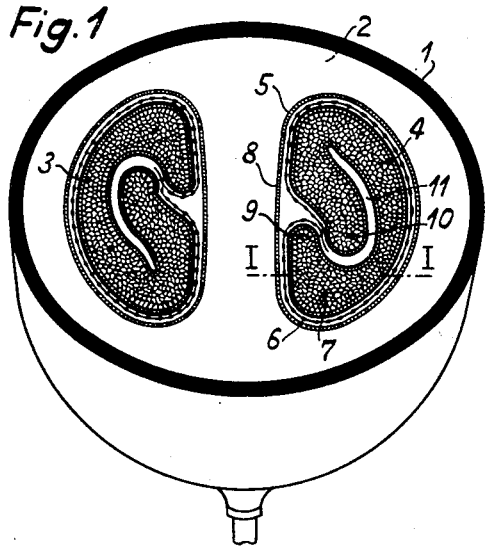
Fig. 1 is a somewhat diagrammatic sectional view of a coffee bean.
Figure 2:
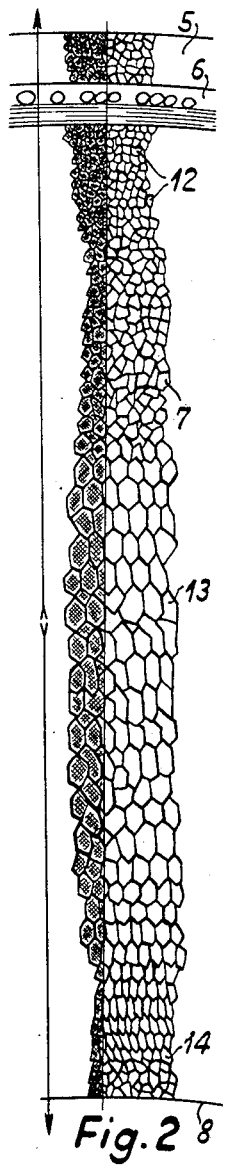
Fig. 2 is an enlarged developed sectional view taken on the line II—II of Fig. 1.
Figure 3:
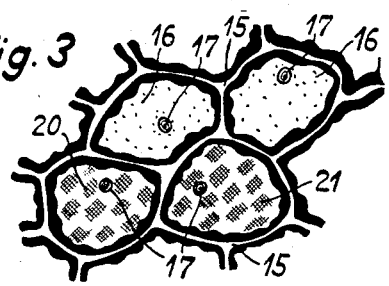
Figs. 3 and 4 are further enlarged sectional views of different groups of coffee-bean cells.
Figure 4:
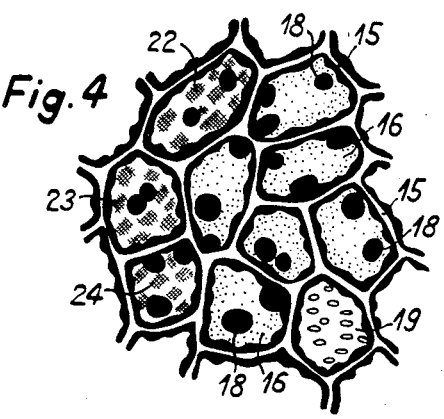

As shown in Fig. 1, the fruit of the coffee-plant consists of a skin 1 (exocarp), in the pulp 2 (mesocarp) of which two seeds, the coffee beans 3 and 4, are enclosed, each of which comprises a parchment layer 5 (endocarp), a seed skin 6 (also called silver skin or integument) and the nutritive tissue 7 (endosperm). The longitudinal edges 9 and 10, which are folded into one another on the flat side 8 of the bean, form the cavity 11 which has the shape of a compressed spiral. A section along the line II—II in Fig. 1 results in a picture as shown in Fig. 2. At 5 there is again shown the parchment layer, at 6 the seed skin and at 7 the nutritive tissue which is composed of more or less uniformly shaped cells 12, 13, 14. Towards the inner flat side 8 the cells 13 become somewhat longer and narrower than the cells 12 on the outer convex side. Near this flat side 8 (bottom edge in Fig. 2) the cells taper once again as indicated at 14. All these cells 12—14 are polyhedric in form and have here and there greatly thickened walls; they are richly supplied with nutritive substances. In Figs. 3 and 4 these cells are shown on a very much enlarged scale (333:1). In these figures, 15 are the cell walls, 16 is the nutritive substance (protoplasm), 17 in Fig. 3 are the starch granules and 18 in Fig. 4 indicates the fatty substances which carry the aroma, at 19 there is shown an empty cell.

The roasting of coffee represents a coking process carried out at about 120–200° C., which is interrupted in its first stage. Roasting gases and aqueous vapor develop, fill the cellular tissue and are separated from the bean during the roasting process, thus producing an internal excess pressure within the said bean.

In coffee the decrease in weight due to roasting is 18–30 percent, and the increase in volume due to the decomposition of the cellulose is 30–50 percent. The following are the proportions of the principal ingredients of roasted coffee, the figures for raw coffee being given in parentheses: water 1.73 percent (11.35 percent), non-nitrogenic substance (water-soluble extracts) 32.39 percent (18.11 percent), sugar 1.23 percent (1.39 percent), albumen 13.77 percent (11.89 percent), raw fibrin 26.31 percent (26.16 percent), caffeine 1.29 percent (1.29 percent), ether extract 13.12 percent (12.34 percent), tannic acid 4.69 percent (4.42 percent) and ash 4.69 percent (4.05 percent). Available test reports have shown that roasted coffee also contains Vitamin C (ascorbic acid). The Roe and Oesterling test method determined that there was a minimum of 750 mg. of Vitamin C in 1000 g. of freshly roasted coffee. This natural Vitamin C, however, is destroyed again shortly after the roasting process for reasons explained hereinbelow.

The aroma carrier is the fatty substance contained in the roasted coffee, an oily liquid having a low melting point (about 25° C.), with a pleasant aroma and pale yellow in color. It consists of oleic acid, palmitic acid and stearic acid in conjunction with glycerine; in addition, the presence of acetone, furfurol, formic acid, acetic acid and other compounds has been proved. The mineral substances present in the bean in the form of organic salts also exert an influence on the formation of the aroma.

The fatty substances in roasted coffee are extremely sensitive; they oxidize easily under the influence of moisture. That, substantially, is the reason for the rapid loss of aroma and quality in coffee which is roasted and then left alone. The natural Vitamin C is also very unstable; on account of its readiness to oxidize it diminishes rapidly in roasted coffee until it is completely lost. The natural Vitamin C reveals here a behavior similar to that of the equivalent synthetic Vitamin C which suffers greatly in the presence of water or moisture.

With the discharging of the roasted material from the roasting apparatus the roasting process is interrupted. The now extremely porous coffee beans are poor heat conductors whose kernels remain hot for a long time. The development of roasting gases and aqueous vapor inside the bean therefore proceeds even when the parts on the outside of the said bean have already cooled down to a large extent and are beginning to absorb moisture from the surrounding atmosphere. This happens once a temperature of about 40° C. has been reached. This degree of cooling, measured on the outside of the coffee bean, may be called the critical temperature. From then on, as natural cooling proceeds, the internal excess pressure is gradually equalized by the cooler air forcing its way in from the outside, so that the vapors continuing to form inside the bean are precipitated in the outer, already cooled parts and leave moisture behind them in the cellular tissue which has become porous and coke-like (cf. 12, 13 and 14 in Fig. 2 and 15, 16 in Figs. 3 and 4). As the cooling effect increases, this moisture precipitate spreads towards the kernel of the bean, that is to say, towards the kernel cells 13 in Fig. 2; moisture deposits of this kind are indicated by cross-hatching in the left half of Fig. 2, as well as in Fig. 3 in the cells 20 and 21 and in Fig. 4 in the cells 22, 23 and 24. This moisture is sufficient to oxidize the fatty substances present in the bean, to destroy very quickly the aromatic substances and the natural Vitamin C and also to damage any added synthetic Vitamin C.

These explanations show that the enveloping of the roasted merely externally cooled coffee beans with protective gases only has the result that the processes cannot be arrested in the internal part of the said beans which remains hot, and that the moisture is, on the contrary, sealed in by such methods and thus allowed more than ever to complete its work of destruction on the fatty substances, the aroma and natural Vitamin C. This still happens even if the coffee beans are exposed to a vacuum before being enveloped with "protective gases." The roasting gases and aqueous vapors which form during the vacuum process are, to be sure, exhausted, but as soon as pressure again replaces the vacuum, the roasting gases and aqueous vapor are forced back into the coffee beans and the inert gases introduced cause a blockage which completely prevents the moisture produced from escaping.

To pre-treat coffee for the purpose of achieving a reliable preservation of the coffee and the maintenance of its nutritive value, it is necessary, in contrast to the known methods, to ensure that the pressure and temperature gradient in the coffee beans during the whole period of the cooling process remains constant so that it runs uninterruptedly and uniformly from the kernel of the roasted coffee bean, i. e., in the example illustrated, from the inner cells 13 in Fig. 2 to the periphery, that is to say, to the cell groups 12 and 14 (in the direction of the arrows) in Fig. 2, in such a way that until the cooling process has almost reached freezing point no blockage or moisture deposit of any sort can form in the cellular structure (12, 13, and 14 in Fig. 2). In accordance with this basic prerequisite, therefore, the present invention relates to a process for the preservation of the coffee and the maintenance of its nutritive value, by which method the coffee beans, immediately after they have been roasted, are left to follow a natural cooling process, characterized by the separation of roasting gases and aqueous vapor, whereby the said beans are cooled practically down to the critical temperature limit below which, owing to the pressure and temperature gradient being reversed, the coffee beans would once again suck in air from the outside, whereupon, at the same time as the said beans are cooled further, they are continuously dehumified and purified by the removal of the roasting gases and aqueous vapors still forming inside them, until they reach a thoroughly dry and cooled state.

The treatment of the coffee in accordance with the invention can, for instance, be effected in a boiler of the type shown in Figs. 5 and 6.

The boiler 25, composed of thick-walled iron plate and provided with a screw-on cover 26, accommodates, while allowing for a sufficiently large, insulating intermediate annular space 27, the inner boiler 29 which consists of thin-walled bright steel plate and is provided with perforations 28 of any desired shape. Connected to the said inner boiler via a cock 30 is the feed hopper 31, whilst the bottom funnel-shaped part 32 leads via a cock 33 to a mill which is not illustrated. The perforations 28 in the wall of the inner boiler 29, which interconnect the inner boiler space 34 and the outer boiler space 27, must, as regards the size of the individual opening, be chosen so that the coffee beans cannot fall through or be sucked out. A conduit 36, together with a cock 37 and filter 38, enables the air to be exhausted from the two boiler spaces 34 and 35. The coolant conduit 39 leads to the two cooling elements 40 and 41 which are airtight and extend through the outer boiler 25 and the inner boiler 29 almost to the bottom funnel 32. Cooling coils 42, containing the coolant, are arranged in the cooling elements 40 and 41. Via the cock 43 a conduit 44 leads into the interior 27 of the outer boiler 25 by means of which conduit the said space can be fed with protective gases, $CO_2$ for instance. Arranged on the outside of the outer boiler 25 is a thermometer 45 which is in operative connection with the interior 34 of the inner boiler 29 and serves to check the temperature of the coffee beans. Also located on the outside of the outer boiler 25 is a manometer 46 which serves to measure the pressure and partial vacuum in the two boiler spaces 34 and 37.

With the aid of the apparatus described and illustrated the method is carried out as follows:

Immediately after roasting the coffee beans are left to cool naturally until they have practically reached the critical temperature limit from which the pressure and temperature gradient tries to turn back. Experience has shown that this happens once a temperature of 40° C. has been reached. Then the roasted coffee beans are poured through the feed hopper 31 and the opened cock 30 into the inner boiler space 34, whereupon the cock 30 is closed and the cock 37 to the exhaust conduit 36 is opened. While the cooling elements 42 and 43, which are kept at a constant temperature of some 5° C., are cooling the coffee beans down to this temperature, the air is continuously exhausted from the two boilers 29, 34 and 25, 27 so that a reversal of the pressure and temperature gradient in the coffee beans is avoided, i. e. the said gradient is continuously or, in other words, throughout the entire cooling period almost until freezing point is reached, maintained in such a way that it runs from the kernel of the individual coffee bean, i. e., in the example illustrated, from the inner cells 13 in Fig. 2 to the periphery, cell groups 12 and 14, following the arrows in Fig. 2. While the outer parts of the coffee bean, that is to say, the cell groups 12 and 14 in Fig. 2, are becoming increasingly cooler under the influence of the cooling elements 40, 41 and 42, the roasting process can be completed undisturbed in the inner cell groups 13 in Fig. 2 because the roasting gases and aqueous vapours still forming are exhausted without trace until the coffee beans are dry, cooled and purified. The possibility of moisture being precipitated in the cells and cellular structures is thus also ruled out. The result at the end of the cooling and dehumifaction process is coffee beans which consist in the main of absolutely dry and pure cell structures, of fatty substances containing the full aroma and of the natural Vitamin C present.

By opening the cock 43 an inert protective gas, $CO_2$ for instance, is fed via the conduit 44, under suitable pressure to the coffee beans pre-treated in the manner described. This gas keeps the roasted coffee permanently in the condition attained by the present method, whereby the fats serving as aroma carriers and the natural Vitamin C present in the coffee are preserved from oxidation and destruction. This fact enables coffee preserved in this way—the condition achieved by the present method always being maintained—to be ground and the ground material to be enriched with physiologically suitable quantities of synthetic Vitamin C, without this vitamin suffering any detriment by reason of its chemical behavior.

The vitamins extracted from natural products and those produced synthetically have the same value. The synthetic Vitamin C forms colorless, odorless crystals which are readily soluble in water. It is non-soluble in fats, benzol and oil. In its dry state Vitamin C is fairly resistant to oxygen. Its chemical formula is $C_6H_8O_6$. In solution Vitamin C is destroyed by oxidizing substances. Destruction is accelerated under the influence of flight, increased temperature and alkaline reaction of the solution as well as in the presence of copper or iron.

Comprehensive tests made in 1948/49 prove that the optimum daily dose of Vitamin C for adults is some 125 mg.; detailed investigations have revealed, in addition, that this quantity is extremely rarely supplied to the body through the usual present-day diet. The human organism is capable neither of storing up Vitamin C nor of producing it itself. This shows the great importance of maintaining the nutritive value of staple and luxury foods. Coffee, being a popular and daily beverage, is particularly well-suited for the purpose because all the constituents dissolved in the infusion of coffee are fed to the body. This, too is the basic reason for the importance of the present invention and for its great difference from other attempts to enrich staple and luxury foods with vitamins, wherein, as in alimentary paste for instance, the vitamins are poured away with the cooking water.

*Example*

If one kg. of coffee powder (roasted ground coffee treated in accordance with the method described) contains 4 g. of natural and added synthetic Vitamin C, the result in one g. of coffee powder is a Vitamin C contens of 4 mg. and in 30 g. of coffee powder a Vitamin C content of 120 mg. These 30 g. of vitaminized coffee powder correspond to the quantity consumed daily in about 6 dl.=3 cups of coffee. In this simple and sure way the human organism can be supplied daily with 120 mg. of Vitamin C which, according to present-day scientific knowledge, is sufficient to obviate a Vitamin C deficiency and its consequences. It goes without saying that the quantity of synthetic Vitamin C to be added can be adapted at any time to the results of new research.

The preserved and enduringly vitaminized ground material is filled into hermetically sealable tin cans or plastic bags which likewise contain protective gases.

Other roasted products, too, can be preserved and enduringly vitaminized by the method according to the invention, for example, barley, rye, figs and the like, either separately or mixed with each other or mixed with roasted, ground and vitaminized coffee.

What I claim is:

1. Process for heating coffee beans, comprising the steps of roasting said beans, allowing said beans to cool to substantially 40° C., producing a pressure gradient from the interior of the beans to the outside by the creation of a partial vacuum around the beans with continuous removal of roasting gases and aqueous vapors from said beans and simultaneously therewith providing a constant coolant temperature for cooling said beans to a temperature below ambient temperature, thereby allowing an undisturbed completion of the roasting process to provide beans in a dry state.

2. A process according to claim 1 wherein the constant coolant temperature is substantially 5° C.

3. A process according to claim 2 comprising the further steps of enveloping the beans in a preservative gaseous atmosphere after cooling to preserve the vitamin content of the said beans.

4. A process according to claim 3 wherein the preservative gas is carbon dioxide.

5. A process according to claim 3 comprising the further step of grinding the beans while in said preservative atmosphere.

References Cited in the file of this patent

UNITED STATES PATENTS

| | | |
|---|---|---|
| 943,238 | DeMattia | Dec. 14, 1909 |
| 2,099,945 | Simpson | Nov. 23, 1937 |
| 2,206,319 | Geitz | July 2, 1940 |
| 2,443,620 | Hubbard | June 22, 1948 |